United States Patent [19]
Reynolds

[11] 3,935,567
[45] Jan. 27, 1976

[54] LEAK DETECTION APPARATUS

[75] Inventor: David E. Reynolds, Littleton, Colo.

[73] Assignee: Continental Oil Company, Ponca City, Okla.

[22] Filed: Apr. 8, 1974

[21] Appl. No.: 459,151

[52] U.S. Cl............. 340/242; 340/309.4; 73/40.5 R
[51] Int. Cl. .......................................... G08b 21/00
[58] Field of Search.............. 340/242, 309.2, 309.3, 340/309.4; 73/40.5 R

[56] References Cited
UNITED STATES PATENTS

| | | | |
|---|---|---|---|
| 3,016,525 | 1/1962 | Hauck | 340/242 |
| 3,261,201 | 7/1966 | Pottash | 340/242 |
| 3,753,260 | 8/1973 | Nelkin | 340/242 |

*Primary Examiner*—Thomas B. Habecker
*Attorney, Agent, or Firm*—William J. Miller

[57] ABSTRACT

A system for detecting a leak in a line consists of an apparatus for detecting a drop to a predetermined pressure in the line; and, once the predetermined pressure is reached, an output is developed by the pressure-sensing apparatus. A bi-state circuit responsive to the output from the detecting apparatus has a first state when no leak is present and a second state when the predetermined pressure is detected. A switching circuit has its input connected through the bi-state circuit. A timing circuit develops a signal at its output after a predetermined time and applies this signal to a bi-state gate circuit. A nonleak detector is coupled to the output of the bi-stable gate circuit to indicate that no leak is present in the system. When the bi-state circuit receives an indication from the detector apparatus that the predetermined pressure has been reached, the bi-state circuit prevents the development of the output signal from the timer circuit and operates an indicator means which indicates that a leak has been detected. The leak detection apparatus is reset on a periodic basis.

6 Claims, 3 Drawing Figures

LEAK DETECTION APPARATUS

BRIEF DESCRIPTION OF THE PRIOR ART

The system herein disclosed particularly relates to the detection of leaks in a gasoline dispensing operation. Present gasoline dispensing systems consist of an underground tank, a pump mounted in the underground tank, a pipe connected from the output of the pump to a dispensing apparatus on the surface of the ground, and electrical means to start and stop the pump. The dispensing means usually consists of a hose coupled from the metering device to a handle or pistol grip containing a hand-operated valve. When the pump is operated, a 20-pound pressure is generated in the line from the pump to the dispensing nozzle. When the nozzle is shut off, the 20-pound pressure is generally maintained for a period of time. If a leak is present in the system, the 20 pounds bleed off quite rapidly. Leak detection devices operate by measuring the bled-off leakage. Previous devices are of a mechanical nature and tend to restrict pump flow during leakage. They are expensive and require extensive installation effort.

BRIEF DESCRIPTION OF THE INVENTION

The device described herein comprises three essential elements — a pressure-sensitive switch, a timing circuit which measures the bleed-down in pressure of the line between the pump and dispensing nozzle, and an indicator means responsive to either a leak or nonleak condition. If a predetermined drop in pressure is measured by the pressure-sensitive switch, a circuit is operated which turns on an indicator light, thereby visually indicating a defective or leaky system. If no leak is detected, a nonleak indicator light is turned on denoting that the system is satisfactory.

DETAILED DESCRIPTION OF THE FIGURES

Figure 1:
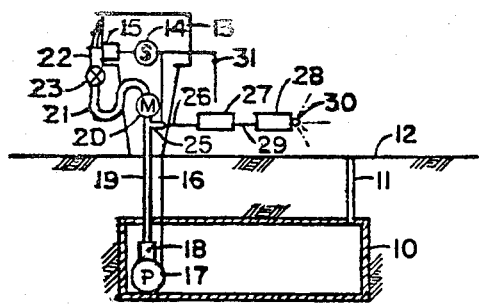
FIG. 1 is a representational sketch of a gasoline dispensing system.

Referring to FIG. 1 a representation of a gasoline dispensing system is illustrated having a tank 10 and a fill tube 11 connected between the surface of the ground 12 and tank 10. A gasoline dispensing apparatus 13 has an electrical switch 14 which is mechanically coupled to a hand-operated lever 15. Under normal conditions the hand-operated lever 15 when rotated closes electrical switch 14, and the closure is communicated through electrical line 16 to a pump 17 located in the bottom of tank 10. Pump 17 is coupled through a check valve 18 and pipe 19 to a metering system 20 and then through a flexible pipe 21 to a hand-held dispenser 22 which contains a hand-operated closure valve 23. In order to measure a leak, a pressure-sensitive switch 25 is connected electrically through wires 26 to an electrical control circuit 27 which in turn is coupled to an indicator box 28 through wires 29. Indicator box 28 has visual indicators 30 which will denote either a leak or nonleak condition. Switch 14 is also coupled through a wire 31 to electrical control box 27 to reset the apparatus after each use.

The operation of the system above-described is as follows:

Tank 10 is filled with gasoline or other petroleum product through a fill tube 11. In order to remove the product from tank 10, a dispenser 22 is removed from its holder and hand-operated lever 15 mechanically rotated to close switch 14. Closure of switch 14 applies power, usually 110 volts, down line 16 to pump 17 which begins to draw product from tank 10 through check valve 18 and into pipe 19, building the pressure to approximately 20 pounds. When dispenser 22 is inserted into a receptacle to receive the product from tank 10, hand-operated valve 23 is opened, permitting material to flow from pipe 19 through meter 20, flexible pipe 21, out dispenser 22, and into the receptacle. Once the container is filled, valve 23 is closed, causing pressure to again assume its normal 20 pounds in pipe 19. Before dispenser 22 can be rehung, hand-operated lever 15 must be rotated, turning off switch 14 which disconnects pump 17, shutting it off. When switch 14 is opened, a second set of contacts will energize electrical control circuit 27 and indicator box 28. If the pressure should drop, which pressure drop is measured by pressure-sensitive switch 25, such a drop is communicated through wire 26 to electrical control circuit 27 which will in turn transmit the information to indicator box 28 and visual indicator 30. If the predetermined pressure drop is not reached within a specified period of time, such as 15 seconds, then a timing circuit in electrical control box 27 will communicate this information through wire 29 to indicator box 28 and likewise to visual indicator 30. Once the time period has elapsed, the system is locked, and any additional pressure drop will have no effect on the electronic circuitry.

DETAILED DESCRIPTION OF THE ELECTRONIC CIRCUIT

Figure 2:
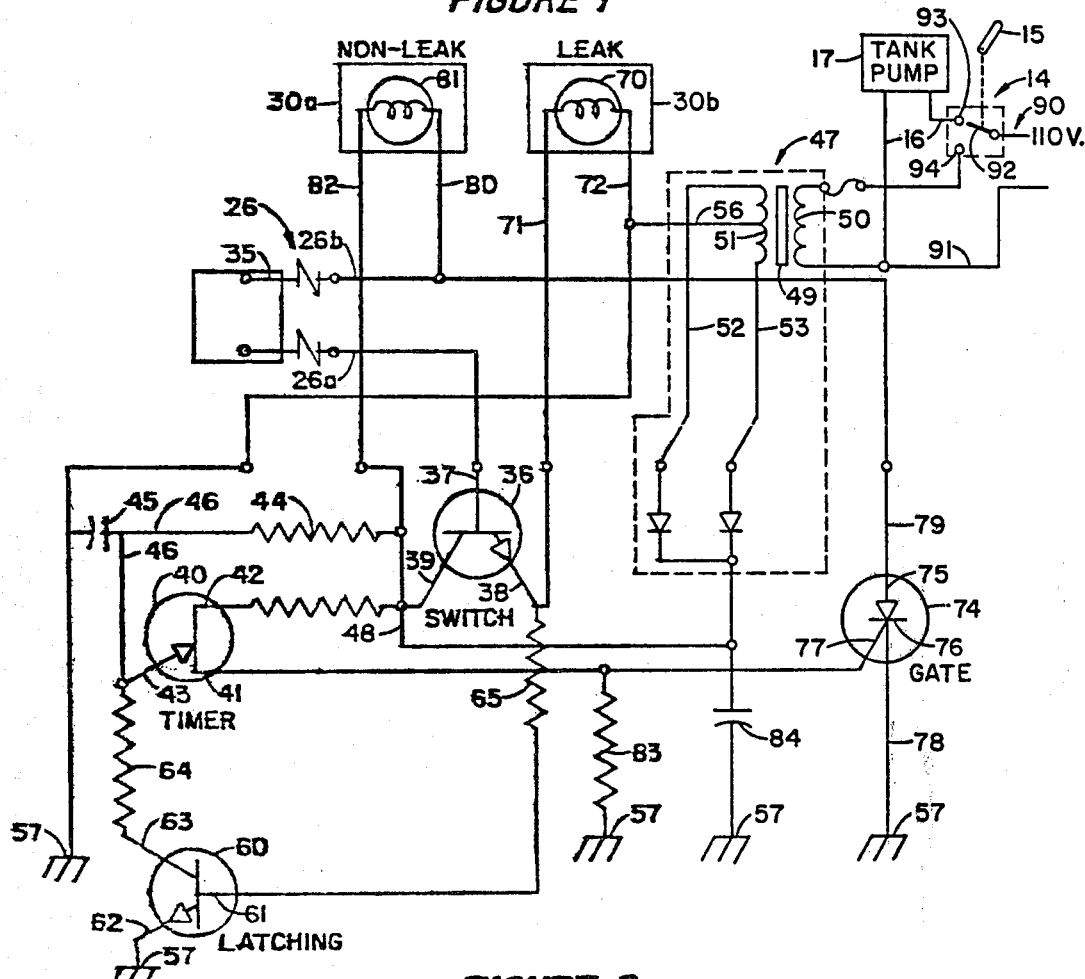
FIG. 2 is an electronic circuitry used to operate the leak or nonleak indicators for the system illustrated in FIG. 1.

Referring to FIG. 2 the electronic circuitry for indicating a leak or nonleak condition is fully illustrated and consists of pressure-sensitive switch 25 which has a mechanical switch 35 mounted therein connected to wires 26 and individually referred to as 26a and 26b. Switch wire 26a is coupled to the base of a transistor 36 which operates electronically as a bi-stable switch. A timing circuit comprises a unijunction semiconductor 40 which has a first base 41, a second base connection 42, and an emitter 43. An R-C timing circuit comprises a resistor 44 and a capacitor 45. Resistor 44 is connected through wire 46 to capacitor 45 and to emitter 43. The other end of resistor 44 is connected to power source 47 through a wire 48. Power source 47 consists of a transformer 49 having a primary 50 and a secondary 51. The ends of secondary 51 are connected through wires 52 and 53 to diodes 54 and 55, respectively, which generate power to wire 48. Secondary 51 likewise has a center tap 56 which is coupled to ground 57 through wire 58. Capacitor 45 likewise has its remaining side connected to wire 58 and then to ground 57. Transistor 36, which has previously been referred to as a switch, has a base 37, an emitter 38, and a collector 39. A latching transistor 60 has a base 61, an emitter 62 connected to ground 57, and a collector 63 which is connected through resistor 64 to the emitter 43 of unijunction semiconductor 40. Base 61 of latching transistor 60 is connected through resistor 65 to emitter 38 of switch 37. The leak indicator referred to as 30b has a light 70 with one end connected through wire 71 to emitter 38 and the other end connected through wire 72 to wire 58 which in turn is connected to ground 57. A gate silicon-controlled rectifier (SCR) 74 comprises an anode 75, a cathode 76, and a gate 77. Cathode 76 is connnected through a wire 78 to ground 57, and the anode 75 is connected through wire 79 to wire 80 which in turn is connected to one end of indicator light 81. Indicator light 81 has its remaining end connected to a wire 82 to wire 48 which in turn is connected to a source of power. Capacitor 84 provides additional filtering for power source 47. Resistor 83 is coupled between gate 77 and ground 57. 110-volt supply source 90 has one side connected through wire 91 to primary 50 and the other side connected to the arm 92 of switch 14. Contact 93 is connected through wire 16 to pump 17, and the remaining switch contact 94 is connected to primary 50.

The operation of the circuit is as follows:

Switch 14 in the position illustrated makes with contact 93 applying power to tank pump 17. In this position the electronic circuitry is unpowered. When hand-operated lever 15 throws switch 14 so that it makes with contact 94, the tank pump 17 is de-energized, and primary 50 is connected to the source 90 of 110 volts. During the nonleak condition switch 25 is in the open condition as illustrated. Power is then supplied to wire 48. Power is also supplied to the timer, unijunction semiconductor 40, and to the R-C circuit comprising the resistor 44 and capacitor 45. As the capacitor charges, voltage builds up on emitter 43. Once it reaches approximately seven-tenths of the voltage between bases 41 and 42, the unijunction semiconductor abruptly conducts heavily through base 41 until it has discharged capacitor 45 which will drop the voltage across the capacitor to approximately 1.6 volts. At this voltage the unijunction semiconductor 40 again reverts to a reverse bias state and the cycle repeats. During the heavy conduction cycle current passes through resistor 83 developing a pulse across resistor 83 which is applied to gate SCR 74. The pulse across resistor 83 will be applied to gate 77, causing the SCR 74 to conduct. Once SCR conducts, it will remain in a conductive state regardless of the continual operation of timer unijunction semiconductor 40. Current will pass through wires 78, 79, and 80, through indicator bulb 81, wire 82, and wire 48 to the source of power 47. If a leak should develop in the pipe 19, meter 20, or hose 21, or anywhere else along the piping circuit, the pressure will drop in the line when hand-controlled valve 23 is controlled and pump 17 de-energized.

When the above occurs switch 35 will close. Thus a circuit will be completed from the base 37 of switch transistor 36 through wire 26a, switch 35, wire 26b, wire 80, nonleak indicator 81, wire 82 to wire 48, and to source of power 47. Switch transistor 36 will then go from non-conductance into a saturated condition completing a circuit from wire 48 which is a source of power, through wire 71, leak detector 70, wire 72 to wire 58, and ground 57. The voltage to the leak indicator 70 is also applied to resistor 65 and the base 61 of latching transistor 60. Forward biased transistor 60 prevents the unijunction semiconductor's 40 emitter 43 voltage from reaching firing level and thereby prevents triggering of the nonleak circuit through SCR 74. The entire circuit is reset when hand-operated lever 15 returns switch arm 92 from contact 94 to contact 93, thereby removing power from the entire electronic circuitry.

Pressure-Sensitive Switch

Figure 3:
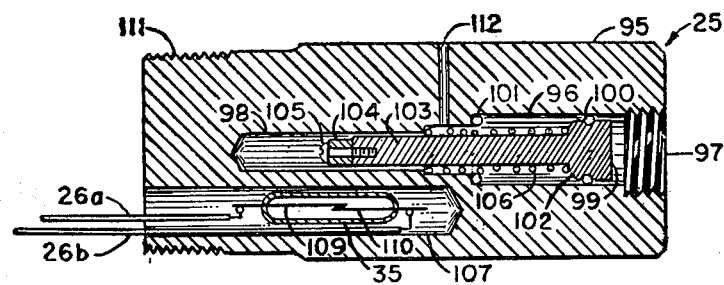
FIG. 3 is a cross-sectional view of a pressure-sensitive switch used to operate the circuit shown in FIG. 2.

Referring to FIG. 3 a detailed drawing of the pressure-sensitive switch 25 is illustrated and essentially comprises a housing 95 having a cylindrical hole 96 bored into the housing to form a cylinder. Threads 97 are formed into the open end of the cylinder so that a pipe or other mounting means can be attached thereto for communication with pipe 19 (see FIG. 1). Hole 96 has an extension 98 which is bored so that it does not pass all the way through housing 95. Inside hole or cylinder 96 is mounted a piston 99 which is sealed by an O-ring 100. A second O-ring 101 is mounted at the end of cylinder 96 and abuts against chamfer 102 on the side of piston 99. An extension 103 is formed from piston 99 and has a magnet 104 attached by means of a screw 105 to the terminus of the extension 103. A spring-biasing means 106 causes piston 102 to always be urged toward threads 97. A second opening 107 is formed in the opposite side of housing 95 and axially aligned with opening or hole 96. Into opening 107 is positioned a reed relay switch 35 which has contacts 109 and 110. Wires 26a and 26b are attached to relay contacts 109 and 110, respectively. Threads 111 are formed around housing 95 to provide some means for enclosing the hole 107 from the environment and to provide an explosion-proof seal. A small vent hole 112 is placed through housing 95 and into hole 96.

The device operates in the following manner:

Pressure is applied to the cylinder 96 at the threaded side 97, forcing back piston 99 until chamfer 102 strikes O-ring 101. The spring 106 will constantly be biasing piston 109 toward threads 97. Thus a decrease in pressure will cause the piston 99 to move in the direction of threads 97. As the pressure decreases magnet 104 will move over the junction of contacts 109 and 110, magnetizing them and causing them to contact each other. Once they are contacted, the circuit between wires 26a and 26b will be closed.

It is obvious, of course, that since a magnet is being used as the means for closing the relay contacts, housing 95 should be made of a nonferrous material, such as copper, brass, or plastic.

The pressure-sensitive switch disclosed also provides total isolation between the source of pressure, such as volatile gasoline, and the switching circuit, which provides the command to the electronic circuit that either a leak or nonleak condition exists. Such isolation is necessary if a safe system from explosion is to be provided.

Conclusions

An easy-to-install leak detection system has been disclosed. The pressure-sensitive switch can be installed in any manner in the piping system between the pump and the dispensing unit. The electronic circuitry can be mounted either on the pump or in the filling station or any other location remote from the pump, since only electrical wires connect the two; furthermore, the electronic circuitry requires a fairly small amount of current to operate, such as, for example, 0.001 amps.

It is obvious, of course, that an audible system can also be incorporated as well as a print-out system which can be available for inspection at any time by persons interested in pollution and the occurrence of same.

The system as disclosed is designed to provide a warning if one-half pint of fluid escapes from the piping system in 15 seconds or less; however, the level of leakage can be adjusted to any desired amount.

It is also obvious that mechanical relays can be used in lieu of semiconductor circuits, and such substitution is fully contemplated as being within the scope of this invention as set out in the specification and appended claims.

What I claim is:

1. A leak detection device for a system under pressure comprising:
   a. means for detecting a predetermined pressure;
   b. a bi-state means responsive to said detecting means having a first state when no leak is present and having a second state when a predetermined pressure is detected;
   c. switch means having its input connected through said bi-state means;
   d. timing means having a signal at its output after a predetermined period of time;
   e. bi-stable gate means having its input connected to said timing means output;
   f. a nonleak indicator means coupled to the output of said bi-stable gate means to indicate that no leak is present in the system;
   g. means responsive to said second state coupled to said timing circuit and said switch means to eliminate said time output signal to said bi-state gate means and operate said switching means;
   h. an indicator means coupled to said switching means to indicate that a leak has been detected; and
   i. means for resetting said bi-stable gate.

2. A circuit for a leak detecting system having a pressure-sensing apparatus and an output circuit responsive to a predetermined pressure, said circuit comprising:
   a. an input;
   b. switching means connected to said input;
   c. a timer means generating an output signal after a predetermined interval of time;
   d. bi-stable switch means having an input and an output circuit;
   e. means for applying the output signal from said timer means to the input of said switch means for closing its output upon receiving said timing signal;
   f. a nonleak indicator means connected to the output of said bi-stable output circuit for operating said indicator when said output circuit is closed;
   g. leak indicator means connected to said switch means;
   h. means for connecting said timer to said pressure-sensing apparatus output for terminating the output signal from said timer and for closing said switching means to operate said leak indicator means; and
   i. means for resetting said circuit.

3. A circuit as described in claim 2 wherein said timer means comprises a unijunction transistor having first and second bases and an emitter; means for applying power to said first and second bases and through a resistor to ground; and through an R-C network to said emitter.

4. A circuit as described in claim 2 wherein said bi-stable switch means comprises a silicon-controlled rectifier having an anode, a cathode, and a gate, and wherein said cathode and anode are connected in series with a power source and said nonleak indicating means, and said gate is connected to receive the output signal from said timer circuit means.

5. A circuit as described in claim 2 wherein said switch means comprises a first and second transistor having a base collector and emitter, said first transmitter having its base connected to said input and its emitter connected to said leak indicator means and to the base of said second transister and its collector connected to the means for connecting said timer to said pressure-sensing apparatus output.

6. A leak detection circuit for a system having a pressure-sensing apparatus and an output circuit responsive to a predetermined pressure, said circuit comprising:
   a. power means having a ground;
   b. a unijunction timing circuit having a first and second base and an emitter;
   c. R-C timing interval means connected between said source of power and said emiter;
   d. an output means connected from said first base to ground;
   e. an R-C time contact means connected from said power means to said base and to said ground;
   f. a gated switching circuit having an input, output, and gate;
   g. a nonleak indicating means connected from a source of power through the input and output of said gated circuit to ground;
   h. a leak indicating means connected from ground through the emitter to collector of a first transistor to a source of power and means for connecting the base of said first transistor through said output circuit to a source of power; and
   i. a second transistor having means connecting its base to the emitter of said first transistor means for connecting its emitter to ground and means for connecting its collector to the emitter of said unijunction timing transistor.

* * * * *